US006940507B2

(12) United States Patent
Repin et al.

(10) Patent No.: US 6,940,507 B2
(45) Date of Patent: Sep. 6, 2005

(54) METHOD AND APPARATUS FOR VISUALIZATION OF 3D VOXEL DATA USING LIT OPACITY VOLUMES WITH SHADING

(76) Inventors: Dmitriy G. Repin, 1715 Enclave Pkwy. #808, Houston, TX (US) 77077; Mark S. Passolt, 523 Bayou Knoll, Houston, TX (US) 77079

(*) Notice: Subject to any disclaimer, the term of this patent is extended or adjusted under 35 U.S.C. 154(b) by 299 days.

(21) Appl. No.: 10/017,560

(22) Filed: Dec. 14, 2001

(65) Prior Publication Data

US 2002/0109684 A1 Aug. 15, 2002

Related U.S. Application Data

(60) Provisional application No. 60/256,433, filed on Dec. 18, 2000.

(51) Int. Cl.[7] .............................................. G06T 17/00
(52) U.S. Cl. ...................... 345/424; 345/421; 345/423; 345/426; 345/427; 382/128
(58) Field of Search ................................ 345/424, 426, 345/421, 423, 427; 382/128

(56) References Cited

U.S. PATENT DOCUMENTS

| | | | |
|---|---|---|---|
| 4,835,712 A | | 5/1989 | Drebin |
| 5,499,323 A | * | 3/1996 | Doi et al. .................... 345/426 |
| 5,766,129 A | | 6/1998 | Mochizuki |
| 5,986,662 A | | 11/1999 | Argiro et al. |
| 6,130,671 A | | 10/2000 | Argiro |
| 6,219,059 B1 | | 4/2001 | Argiro |
| 6,278,459 B1 | * | 8/2001 | Malzbender et al. ........ 345/424 |

OTHER PUBLICATIONS

Derek R. Ney et al., "Volumetric Rendering of Computed Tomography Data: Principles and Techniques", IEEE Computer Graphics & Applications, Mar. 1990, p. 19–27.

Robert A. Drebin et al., "Volume Rendering", Computer Graphics, vol. 22, No. 4, Aug. 1988, p. 110–119.

Gerald D. Kidd, "Fundamentals of 3–D Seismic Volume Visualization", The Leading Edge, Jun. 1999, p. 702–710.

Tatum M. Sheffield et al., "Geovolume Visualization Interpretation: Color in 3–D Volumes", The Leading Edge, Jun. 1999, p. 668–674.

Rüdiger Westermann, et al., "Efficiently Using Graphics Hardware in Volume Rendering Applications", Computer Graphics Proceedings, Annual Conference Series, 1998, p. 169–177.

(Continued)

*Primary Examiner*—Kimbinh T. Nguyen
(74) *Attorney, Agent, or Firm*—John H. Bouchard; Danita J. M. Maseles

(57) ABSTRACT

A volume rendering process is disclosed for improving the visual quality of images produced by rendering and displaying volumetric data in voxel format for the display of three-dimensional (3D) data on a two-dimensional (2D) display with shading and opacity to control the realistic display of images rendered from the voxels. The process includes partitioning the plurality of voxels among a plurality of slices with each slice corresponding to a respective region of the volume. Each voxel includes an opacity value adjusted by applying an opacity curve to the value. The opacity value of each voxel in each cell in the volume is converted into a new visual opacity value that is used to calculate a new visual opacity gradient for only one voxel in the center of each cell. The visual opacity gradient is used to calculate the shading, used to modify the color of individual voxels based on the orientation of opacity isosurfaces passing through each voxel in the volume, in order to create a high quality, realistic image.

21 Claims, 16 Drawing Sheets

OTHER PUBLICATIONS

Michael Meibner et al., "Enabling Classification and Shading for 3D Texture Mapping based Volume Rendering using OpenGL and Extensions", Proceedings of the Conference on Visualization, 1999, p. 207–214.

Victoria Interrante et al., "Rendering", Department of Computer Science, The University of North Carolina at Chapel Hill, p. 41–65.

Karl Heinz Hohne et al., "Voxel–based Volume Visualization Techniques", Institute of Mathematics and Computer Science in Medicine, University Hospital, Eppendorf, University of Hamburg, p. 66–83.

Karl Heinz and Ralph Bernstein, "Shading 3D–Images from CT Using Gray–Level Gradients", Transactions on medical imaging, vol MI–5, No. 1, Mar. 1986.

* cited by examiner (SEE FIG. 19)

(SEE FIG. 18)

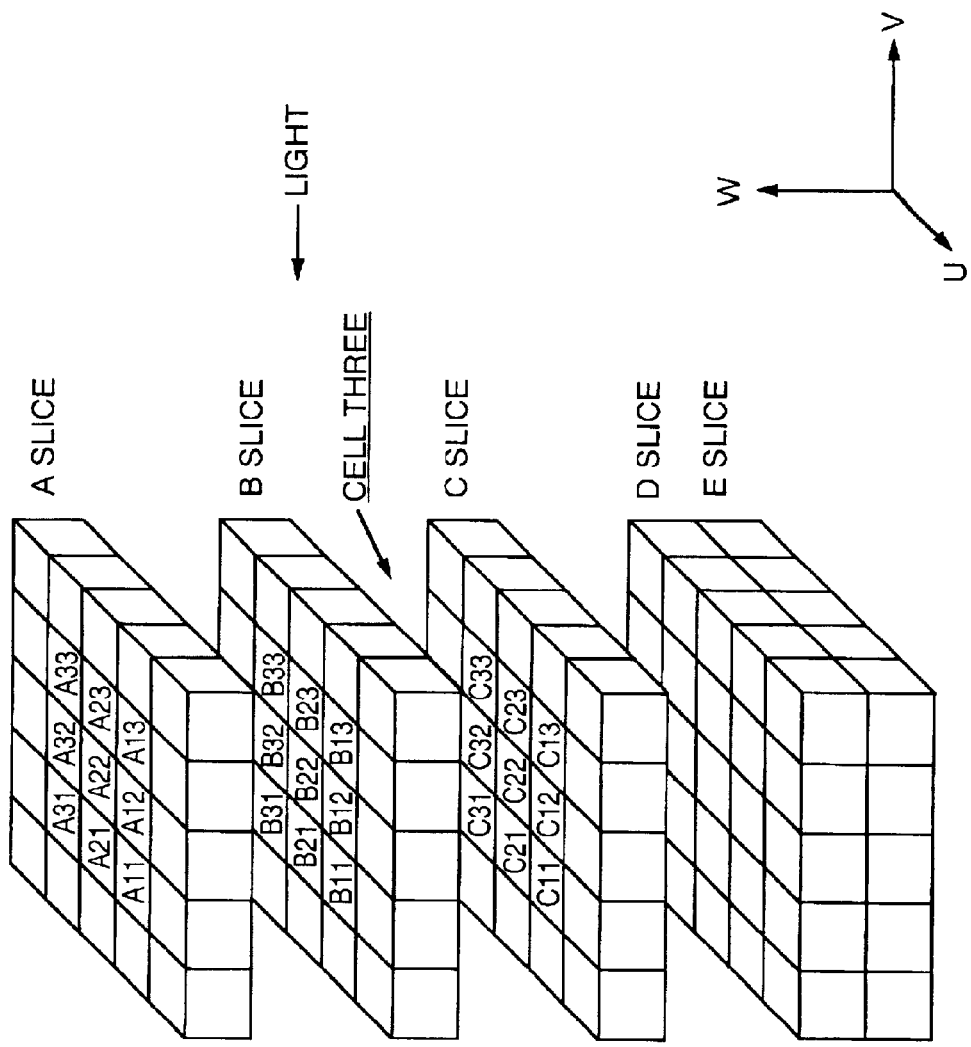
FIG. 17 (SEE FIG. 20)

| A Slice | B Slice | C Slice |
|---|---|---|
| $\alpha A11 = \beta A11$ | If $\beta A11 > \alpha B11$, then $\beta B11 = \beta A11$ | If $\beta B11 > \alpha C11$, then $\beta C11 = \beta B11$ |
| | If $\beta A11 \leq \alpha B11$, then $\beta B11 = \alpha B11$ | If $\beta B11 \leq \alpha C11$, then $\beta C11 = \alpha C11$ |
| $\alpha A12 = \beta A12$ | If $\beta A12 > \alpha B12$, then $\beta B12 = \beta A12$ | If $\beta B12 > \alpha C12$, then $\beta C12 = \beta B12$ |
| | If $\beta A12 \leq \alpha B12$, then $\beta B12 = \alpha B12$ | If $\beta B12 \leq \alpha C12$, then $\beta C12 = \alpha C12$ |
| $\alpha A13 = \beta A13$ | If $\beta A13 > \alpha B13$, then $\beta B13 = \beta A13$ | If $\beta B13 > \alpha C13$, then $\beta C13 = \beta B13$ |
| | If $\beta A13 \leq \alpha B13$, then $\beta B13 = \alpha B13$ | If $\beta B13 \leq \alpha C13$, then $\beta C13 = \alpha C13$ |
| $\alpha A21 = \beta A21$ | If $\beta A21 > \alpha B21$, then $\beta B21 = \beta A21$ | If $\beta B21 > \alpha C21$, then $\beta C21 = \beta B21$ |
| | If $\beta A21 \leq \alpha B21$, then $\beta B21 = \alpha B21$ | If $\beta B21 \leq \alpha C21$, then $\beta C21 = \alpha C21$ |
| $\alpha A22 = \beta A22$ | If $\beta A22 > \alpha B22$, then $\beta B22 = \beta A22$ | If $\beta B22 > \alpha C22$, then $\beta C22 = \beta B22$ |
| | If $\beta A22 \leq \alpha B22$, then $\beta B22 = \alpha B22$ | If $\beta B22 \leq \alpha C22$, then $\beta C22 = \alpha C22$ |
| $\alpha A23 = \beta A23$ | If $\beta A23 > \alpha B23$, then $\beta B23 = \beta A23$ | If $\beta B23 > \alpha C23$, then $\beta C23 = \beta B23$ |
| | If $\beta A23 \leq \alpha B23$, then $\beta B23 = \alpha B23$ | If $\beta B23 \leq \alpha C23$, then $\beta C23 = \alpha C23$ |
| $\alpha A31 = \beta A31$ | If $\beta A31 > \alpha B31$, then $\beta B31 = \beta A31$ | If $\beta B31 > \alpha C31$, then $\beta C31 = \beta B31$ |
| | If $\beta A31 \leq \alpha B31$, then $\beta B31 = \alpha B31$ | If $\beta B31 \leq \alpha C31$, then $\beta C31 = \alpha C31$ |
| $\alpha A32 = \beta A32$ | If $\beta A32 > \alpha B32$, then $\beta B32 = \beta A32$ | If $\beta B32 > \alpha C32$, then $\beta C32 = \beta B32$ |
| | If $\beta A32 \leq \alpha B32$, then $\beta B32 = \alpha B32$ | If $\beta B32 \leq \alpha C32$, then $\beta C32 = \alpha C32$ |
| $\alpha A33 = \beta A33$ | If $\beta A33 > \alpha B33$, then $\beta B33 = \beta A33$ | If $\beta B33 > \alpha C33$, then $\beta C33 = \beta B33$ |
| | If $\beta A33 \leq \alpha B33$, then $\beta B33 = \alpha B33$ | If $\beta B33 \leq \alpha C33$, then $\beta C33 = \alpha C33$ |

FIG. 18

| B Slice | C Slice | D Slice |
|---|---|---|
| $\alpha B11 = \beta B11$ | If $\beta B11 > \alpha C11$, then $\beta C11 = \beta B11$ | If $\beta C11 > \alpha D11$, then $\beta D11 = \beta C11$ |
|  | If $\beta B11 \leq \alpha C11$, then $\beta C11 = \alpha C11$ | If $\beta C11 \leq \alpha D11$, then $\beta D11 = \alpha D11$ |
| $\alpha B12 = \beta B12$ | If $\beta B12 > \alpha C12$, then $\beta C12 = \beta B12$ | If $\beta C12 > \alpha D12$, then $\beta D12 = \beta C12$ |
|  | If $\beta B12 \leq \alpha C12$, then $\beta C12 = \alpha C12$ | If $\beta C12 \leq \alpha D12$, then $\beta D12 = \alpha D12$ |
| $\alpha B13 = \beta B13$ | If $\beta B13 > \alpha C13$, then $\beta C13 = \beta B13$ | If $\beta C13 > \alpha D13$, then $\beta D13 = \beta C13$ |
|  | If $\beta B13 \leq \alpha C13$, then $\beta C13 = \alpha C13$ | If $\beta C13 \leq \alpha D13$, then $\beta D13 = \alpha D13$ |
| $\alpha B21 = \beta B21$ | If $\beta B21 > \alpha C21$, then $\beta C21 = \beta B21$ | If $\beta C21 > \alpha D21$, then $\beta D21 = \beta C21$ |
|  | If $\beta B21 \leq \alpha C21$, then $\beta C21 = \alpha C21$ | If $\beta C21 \leq \alpha D21$, then $\beta D21 = \alpha D21$ |
| $\alpha B22 = \beta B22$ | If $\beta B22 > \alpha C22$, then $\beta C22 = \beta B22$ | If $\beta C22 > \alpha D22$, then $\beta D22 = \beta C22$ |
|  | If $\beta B22 \leq \alpha C22$, then $\beta C22 = \alpha C22$ | If $\beta C22 \leq \alpha D22$, then $\beta D22 = \alpha D22$ |
| $\alpha B23 = \beta B23$ | If $\beta B23 > \alpha C23$, then $\beta C23 = \beta B23$ | If $\beta C23 > \alpha D23$, then $\beta D23 = \beta C23$ |
|  | If $\beta B23 \leq \alpha C23$, then $\beta C23 = \alpha C23$ | If $\beta C23 \leq \alpha D23$, then $\beta D23 = \alpha D23$ |
| $\alpha B31 = \beta B31$ | If $\beta B31 > \alpha C31$, then $\beta C31 = \beta B31$ | If $\beta C31 > \alpha D31$, then $\beta D31 = \beta C31$ |
|  | If $\beta B31 \leq \alpha C31$, then $\beta C31 = \alpha C31$ | If $\beta C31 \leq \alpha D31$, then $\beta D31 = \alpha D31$ |
| $\alpha B32 = \beta B32$ | If $\beta B32 > \alpha C32$, then $\beta C32 = \beta B32$ | If $\beta C32 > \alpha D32$, then $\beta D32 = \beta C32$ |
|  | If $\beta B32 \leq \alpha C32$, then $\beta C32 = \alpha C32$ | If $\beta C32 \leq \alpha D32$, then $\beta D32 = \alpha D32$ |
| $\alpha B33 = \beta B33$ | If $\beta B33 > \alpha C33$, then $\beta C33 = \beta B33$ | If $\beta C33 > \alpha D33$, then $\beta D33 = \beta C33$ |
|  | If $\beta B33 \leq \alpha C33$, then $\beta C33 = \alpha C33$ | If $\beta C33 \leq \alpha D33$, then $\beta D33 = \alpha D33$ |

FIG. 19

| A Slice | B Slice | C Slice |
|---|---|---|
| $\alpha A33 = \beta A33$ | If $\beta A33 > \alpha A32$, then $\beta A32 = \beta A33$ | If $\beta A32 > \alpha A31$, then $\beta A31 = \beta A32$ |
| | If $\beta A33 \leq \alpha A32$, then $\beta A32 = \alpha A32$ | If $\beta A32 \leq \alpha A31$, then $\beta A31 = \alpha A31$ |
| $\alpha A23 = \beta A23$ | If $\beta A23 > \alpha A22$, then $\beta A22 = \beta A23$ | If $\beta A22 > \alpha A21$, then $\beta A21 = \beta A22$ |
| | If $\beta A23 \leq \alpha A22$, then $\beta A22 = \alpha A22$ | If $\beta A22 \leq \alpha A21$, then $\beta A21 = \alpha A21$ |
| $\alpha A13 = \beta A13$ | If $\beta A13 > \alpha A12$, then $\beta A12 = \beta A13$ | If $\beta A12 > \alpha A11$, then $\beta A11 = \beta A12$ |
| | If $\beta A13 \leq \alpha A12$, then $\beta A12 = \alpha A12$ | If $\beta A12 \leq \alpha A11$, then $\beta A11 = \alpha A11$ |
| $\alpha B33 = \beta B33$ | If $\beta B33 > \alpha B32$, then $\beta B32 = \beta B33$ | If $\beta B32 > \alpha B31$, then $\beta B31 = \beta B32$ |
| | If $\beta B33 \leq \alpha B32$, then $\beta B32 = \alpha B32$ | If $\beta B32 \leq \alpha B31$, then $\beta B31 = \alpha B31$ |
| $\alpha B23 = \beta B23$ | If $\beta B23 > \alpha B22$, then $\beta B22 = \beta B23$ | If $\beta B22 > \alpha B21$, then $\beta B21 = \beta B22$ |
| | If $\beta B23 \leq \alpha B22$, then $\beta B22 = \alpha B22$ | If $\beta B22 \leq \alpha B21$, then $\beta B21 = \alpha B21$ |
| $\alpha B13 = \beta B13$ | If $\beta B13 > \alpha B12$, then $\beta B12 = \beta B13$ | If $\beta B12 > \alpha B11$, then $\beta B11 = \beta B12$ |
| | If $\beta B13 \leq \alpha B12$, then $\beta B12 = \alpha B12$ | If $\beta B12 \leq \alpha B11$, then $\beta B11 = \alpha B11$ |
| $\alpha C33 = \beta C33$ | If $\beta C33 > \alpha C32$, then $\beta C32 = \beta C33$ | If $\beta C32 > \alpha C31$, then $\beta C31 = \beta C32$ |
| | If $\beta C33 \leq \alpha C32$, then $\beta C32 = \alpha C32$ | If $\beta C32 \leq \alpha C31$, then $\beta C31 = \alpha C31$ |
| $\alpha C23 = \beta C23$ | If $\beta C23 > \alpha C22$, then $\beta C22 = \beta C23$ | If $\beta C22 > \alpha C21$, then $\beta C21 = \beta C22$ |
| | If $\beta C23 \leq \alpha C22$, then $\beta C22 = \alpha C22$ | If $\beta C22 \leq \alpha C21$, then $\beta C21 = \alpha C21$ |
| $\alpha C13 = \beta C13$ | If $\beta C13 > \alpha C12$, then $\beta C12 = \beta C13$ | If $\beta C12 > \alpha C11$, then $\beta C11 = \beta C12$ |
| | If $\beta C13 \leq \alpha C12$, then $\beta C12 = \alpha C12$ | If $\beta C12 \leq \alpha C11$, then $\beta C11 = \alpha C11$ |

FIG. 20

$$G_U = (\beta A11 + \beta A12 + \beta A13 + \beta B11 + \beta B12 + \beta B13 + \beta C11 + \beta C12 + \beta C13) -$$
$$(\beta A31 + \beta A32 + \beta A33 + \beta B31 + \beta B32 + \beta B33 + \beta C31 + \beta C32 + \beta C33)$$

$$G_V = (\beta A13 + \beta A23 + \beta A33 + \beta B13 + \beta B23 + \beta B33 + \beta C13 + \beta C23 + \beta C33) -$$
$$(\beta A11 + \beta A21 + \beta A31 + \beta B11 + \beta B21 + \beta B31 + \beta C11 + \beta C21 + \beta C31)$$

$$G_W = (\beta A11 + \beta A12 + \beta A13 + \beta A21 + \beta A22 + \beta A23 + \beta A31 + \beta A32 + \beta A33) -$$
$$(\beta C11 + \beta C12 + \beta C13 + \beta C21 + \beta C22 + \beta C23 + \beta C31 + \beta C32 + \beta C33)$$

FIG. 21

$$G_U = (\beta B11 + \beta B12 + \beta B13 + \beta C11 + \beta C12 + \beta C13 + \beta D11 + \beta D12 + \beta D13) -$$
$$(\beta B31 + \beta B32 + \beta B33 + \beta C31 + \beta C32 + \beta C33 + \beta D31 + \beta D32 + \beta D33)$$

$$G_V = (\beta B13 + \beta B23 + \beta B33 + \beta C13 + \beta C23 + \beta C33 + \beta D13 + \beta D23 + \beta D33) -$$
$$(\beta B11 + \beta B21 + \beta B31 + \beta C11 + \beta C21 + \beta C31 + \beta D11 + \beta D21 + \beta D31)$$

$$G_W = (B11 + B12 + B13 + B21 + B22 + B23 + B31 + B32 + B33) -$$
$$(\beta D11 + \beta D12 + \beta D13 + \beta D21 + \beta D22 + \beta D23 + \beta D31 + \beta D32 + \beta D33)$$

FIG. 22

$$G_U = (\beta B11 + \beta B12 + \beta B13 + \beta C11 + \beta C12 + \beta C13 + \beta D11 + \beta D12 + \beta D13) -$$
$$(\beta B31 + \beta B32 + \beta B33 + \beta C31 + \beta C32 + \beta C33 + \beta D31 + \beta D32 + \beta D33)$$

$$G_V = (\beta B13 + \beta B23 + \beta B33 + \beta C13 + \beta C23 + \beta C33 + \beta D13 + \beta D23 + \beta D33) -$$
$$(\beta B11 + \beta B21 + \beta B31 + \beta C11 + \beta C21 + \beta C31 + \beta D11 + \beta D21 + \beta D31)$$

$$G_W = (\beta B11 + \beta B12 + \beta B13 + \beta B21 + \beta B22 + \beta B23 + \beta B31 + \beta B32 + \beta B33) -$$
$$(\beta D11 + \beta D12 + \beta D13 + \beta D21 + \beta D22 + \beta D23 + \beta D31 + \beta D32 + \beta D33)$$

FIG. 23

METHOD AND APPARATUS FOR VISUALIZATION OF 3D VOXEL DATA USING LIT OPACITY VOLUMES WITH SHADING

CROSS REFERENCE TO RELATED APPLICATIONS

This application is a utility patent application of a prior pending provisional application Ser. No. 60/256,433, filed Dec. 18, 2000, entitled "Visualization of 3d Geoscience Data Using Lit Opacity Volumes With Shading".

FIELD OF THE INVENTION

This invention relates generally to the field of computer graphics. Particularly, this invention relates to volume rendering. More particularly, this invention relates to the display of three-dimensional (3D) data on a two-dimensional (2D) display with shading and opacity to control the realistic display of volumetric data in voxel format.

BACKGROUND OF THE INVENTION

Volume rendering is an important area of computer graphics. It is employed in a wide variety of disciplines, including medicine, geology, biology and meteorology. Volume rendering allows a user to look inside an object and see features that were otherwise shielded by the rendering of the surface features of the object. One patent teaching volume rendering using voxels is U.S. Pat. No. 6,304,266, issued Oct. 16, 2001, entitled "Method and Apparatus For Volume Rendering" which is incorporated herein by reference.

In FIG. 1 volumetric data is shown as consisting of a three-dimensional (3D) dataset of elements called "voxels" 102. Typically, the voxels 102 are uniformly distributed throughout a volume 104. Each voxel 102 has a position in the volume and has associated with it information such as color, illumination, opacity, velocity, amplitude, etc. The information associated with each voxel 102 is produced by such disciplines as medicine (e.g., CAT scans), biology (confocal microscopy), and geoscience (seismic data).

In FIG. 2 is shown how data values of voxels 102 are typically stored in a storage array 202. The position of a particular voxel in the volume is inherent in its location in the array. For example, array position 204 might be associated with a point 106 (FIG. 1) in the volume that is a specified distance from a specified corner of the volume. Typically, a single value is stored in the array 202 for each voxel 102, although it is also possible to store more than one value for each voxel 102, such as for color, illumination, opacity, velocity and amplitude.

FIGS. 3, 4, and 5 show 2D texture rendering subdividing volumetric data into slices. 2D texture rendering organizes the slices into three sets of slices 302, 402 and 502 along three different orthogonal axes. The voxels are partitioned among the sets of slices 302, 402 and 502 and into cells containing multiple voxels in each slice. The partitioning is done based on the position of the voxels in array 202. In a similar fashion, 3D texture rendering typically slices the volume perpendicular to the viewing direction.

The rendering is then accomplished on a slice-by-slice basis, moving from the rear-most slice 304, 404 and 504, respectively, to the front-most slice 306, 406 and 506 respectively. The set of slices that is chosen and processed is the set whose axis makes the smallest angle to the viewing direction. While a new image is rendered it is blended with the previously drawn scene, creating perception of a 3D body. 2D texture rendering organizes the slices along one of the three volume dimensions, while 3D texture rendering slices the volume perpendicular to the viewing direction, which improves image quality, but requires interpolation between the volume data points. Such interpolation is usually performed by specialized graphics hardware.

FIGS. 6 and 7 show how texture value, or "texel," is determined for each voxel in each slice (blocks 702 and 704). The texels are stored in a data buffer 602 (block 706). Typically, the texel value is an indication of the RGB colors (red, green & blue) to be displayed for a voxel as determined by one or more parameters dependent on the data value or values associated with the voxel and is found in a look-up table. For example, the texel data may include a value for each of the red, green, and blue (RGB) components associated with the voxel. When all of the voxels in the slice have been processed (block 704), the contents of the data buffer are downloaded into a texture memory 604 (block 708).

FIG. 8 shows a display device 802 upon which information downloaded with the texel data is displayed. Based on that information and the perspective requested by the user, the display device maps the texels onto pixels on a display screen 804 (block 710). As each slice is downloaded and rendered, the user sees the volume in the requested perspective. Each time the user changes the view, for example by using a software tool to rotate, translate or magnify the image of the volume, the process of downloading and rendering slices is repeated.

In FIG. 9 is illustrated the display of a volume that shows the outside surfaces of the volume. The interior of the volume is not seen.

In some applications, greater flexibility is achieved by using semi-transparent data. Semi-transparent data is created by adding an additional factor, alpha ($\alpha$), to each voxel along with the RGB (red, green & blue) components described above. The value of alpha of a voxel determines the opacity of the voxel. Opacity is a measure of the amount a particular voxel on a slice will allow a voxel on a background slice that maps to the same pixel on a 2D display to show through. The opacity of a voxel controls how the image of the voxel is blended with the images of the voxels behind it in the view being displayed. An opacity value of 0.0 means a voxel is completely transparent and cannot be seen so has no effect on the color of the displayed pixel on the 2D display since it is considered to be empty; and a value of 1.0 means the voxel is completely opaque, may be considered solid and, if it has no other voxels mapped in front of it, its texel determines the color of the displayed pixel. Intermediate opacity values correspond to intermediate levels of opacity, and the texel defined colors of two voxels mapped to the same pixel are mixed in conventional ways to determine the color of the pixel that will be displayed.

In FIG. 10 is illustrated an opacity tool, such as the one included in the GEOVIZ product from Schlumberger-GeoQuest, the assignee of the present invention. The opacity tool is used to map volumetric data, such as geophysical seismic interpretation, magnetic imaging, and ultrasonography data, to see semi-transparent volumetric data therein. In those cases, the value of each voxel is not only mapped to a color defined by its texel but also with an opacity defined by alpha ($\alpha$). In FIG. 10, the user has adjusted the opacity mapping, shown graphically by curve 1002, to make transparent all voxels (alpha=0) except those having large positive or negative values. This has the effect of making most of the data transparent when displayed, as can be seen from the histogram 1004 that reflects the distribution of the values of the voxels in the volumetric data displayed in FIG. 9. This is a technique called "standard opacity volume rendering" and allows a user to make voxels within a selected range of data values invisible, while leaving other voxels visible.

In FIG. 11 is shown a display that results when the data displayed in FIG. 9 is processed using the opacity tool shown in FIG. 10. The surface of the volume no longer obscures structures inside the volume as is evident when comparing FIGS. 9 and 11.

It is also apparent from the histogram 1004 and FIG. 11 that most of the opacity-adjusted voxels are transparent and have no effect on the display.

SUMMARY OF THE INVENTION

The invention is concerned with improving the visual quality of images produced by rendering volumetric data in voxel format for the display of three-dimensional (3D) data on a two-dimensional (2D) display with shading and opacity to control the realistic display of images rendered from the voxels.

One of the main shortcomings of standard opacity volume rendering of the voxel format data volumes described in the Background of the Invention is that objects displayed using a voxel data volume appear flat, which inhibits depth perception and makes it hard, if not impossible, to determine the 3D shape, orientation, and relative positions of the objects.

FIG. 12 shows the display of an elliptical object rendered using standard opacity volume rendering of volumetric data consisting of voxels. Although it is clear that the cross-sectional shape is oval, there is no way to tell if the object is elliptical, ovoid, conical, etc. It is also impossible to tell if the object touches the flat seismic section behind it. The reason for these shortcomings is that traditional computer graphics surface lighting techniques do not work for voxels because the individual voxels have no proper surfaces to be lit.

FIG. 13 shows how an elliptical set of voxels will appear when displayed as a set of solid "bricks" lit with a light. The actual shape of the rendered object can now be seen.

In an attempt to alleviate the shortcomings with rendering and displaying voxels, the viewer makes elaborate adjustments to the volume color map or the opacity values, watches the rendering progressing from back to front, moves the viewpoint or simply employs the imagination to help recreate the objects in his or her mind. The methods are very time-consuming, subjective and difficult for an inexperienced viewer to master, and they all yield unsatisfactory results.

To overcome these shortcomings the invention illuminates a voxel volume with one or more light sources. When rendered and displayed the lighted volume offers the viewer ample visual information to aid in the perception of depth, as well as the shapes, orientations, and positions of objects in the voxel volume. Lighting parameters are computed, and graphical attributes of individual voxels are adjusted based on the orientation of opacity isosurfaces passing through each voxel in the volume.

To improve the display of objects the opacity of displayed voxels of a data volume may be adjusted depending upon the opacity of nearby voxels. Using an opacity tool each voxel in a volume is assigned a standard opacity value a using a 3-dimentional opacity function $\alpha(i,j,k)$ where alpha represents opacity and the letters i,j,k represent orthogonal directions.

Isosurfaces connect voxels with equal opacity values. For each voxel, the algorithm estimates a normal to the isosurface passing though the voxel, which is equal to the negative gradient of the opacity function at the voxel, and uses it to shade the voxel as if it were a point on the isosurface. Though results are typically shown for a single uni-directional white light source, the results can be easily extended to bi-directional light sources or colored lights.

In FIG. 14 are shown the basic steps implemented in the rendering process that includes the teaching of the present invention, and these steps are generally described immediately below. The invention is implemented only in the second and third steps, in blocks 1402, 1403 and 1404.

At block 1401, the initial opacity value of each voxel in the input voxel data volume is processed with an opacity tool, such shown in FIG. 10, to make most of the data transparent when displayed, as previously described, and the structures inside the volume are no longer obscured as can be seen in FIG. 11. As part of this process the initial opacity value for each visible voxel in the data volume is converted to a standard opacity ($\alpha$) value.

At block 1402, the standard opacity value a for each visible voxel is converted to a new "visible opacity" $\beta$ value in accordance with the teaching of the present invention.

At block 1403, a new visible gradient value is calculated for every visible voxel in a volume using the new visible opacity $\beta$ values in accordance with the teaching of the present invention. The new visible gradient value calculated for each voxel accounts for degenerate cases in numeric gradient computation and are used in all further rendering computations. Only visible cells, selected using the opacity tool and having a new visible opacity $\beta$ calculated, have their opacity $\beta$ value used to compute a new visible gradient, $\overline{G}$ for each voxel. The new visible gradient, $\overline{G}$, for each voxel are used to shade and render the displayed voxels.

At block 1404, ambient and diffuse shading is computed that would be applied to an opacity isosurface passing through the voxels in an ambient and diffuse illumination model wherein the voxel volume is illuminated with one or more light sources (typically directional and bi-directional). The direction of the negative visible gradient vector $\overline{G}$ serves as a normal to the isosurface. Special treatment is added for voxels inside opaque areas of the volume based on specifics of volumetric geoscience data, which improves a user's perception of the rendered image. A lighted and shaded volume offers the viewer ample visual information to aid in the perception of depth, as well as the shapes, orientations, and positions of objects in the volume.

At block 1405, for both 2D and 3D textures, the colors of all visible voxels in the volume are modified by applying the shading computed in block 1404.

At block 1406 the processed, visible, voxel data volume, with shading, is displayed.

In one aspect of the invention, a computer is used to process voxel volume data, and the invention comprises an article of manufacture comprising a medium that is readable by the computer and the medium carries instructions for the computer to perform the novel process of calculating the new visible opacity and the visible gradient for each voxel as described in the previous paragraphs.

BRIEF DESCRIPTION OF THE DRAWINGS

The invention will be better understood upon reading the following Description of the Preferred Embodiment in conjunction with the drawings in which:

FIGS. 15–17 are exploded views of volumes each showing a cell made up of voxels that is used to calculate new visual opacity and visual gradient values for voxels;

FIGS. 18–20 are tables showing how the new visual opacity values for voxels are calculated; and FIGS. 21–23 are tables showing how the new visual opacity values are used to calculate new visual gradient values for voxels.

DESCRIPTION OF THE PREFERRED EMBODIMENT

In the following description all reference numbers indicate in which Figure they are located. Thus, for example, reference number 1004 is found in FIG. 10, and reference number 1405 is found in FIG. 14.

Figure 1:
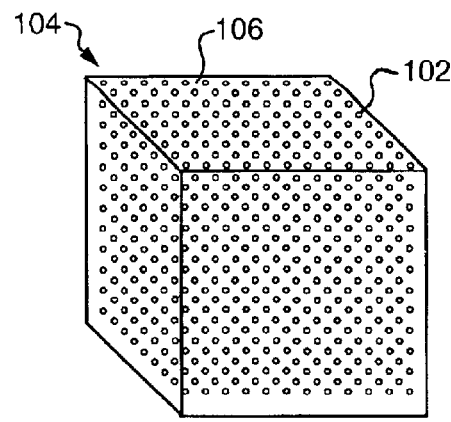
FIG. 1 is a representation of voxels within a cubic volume.
Figure 3:
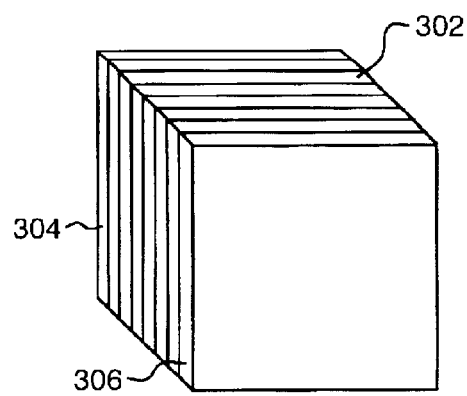
FIGS. 3–5 illustrate the partitioning of a volume into slices in orthogonal planes for 2D texture rendering.
Figure 2:
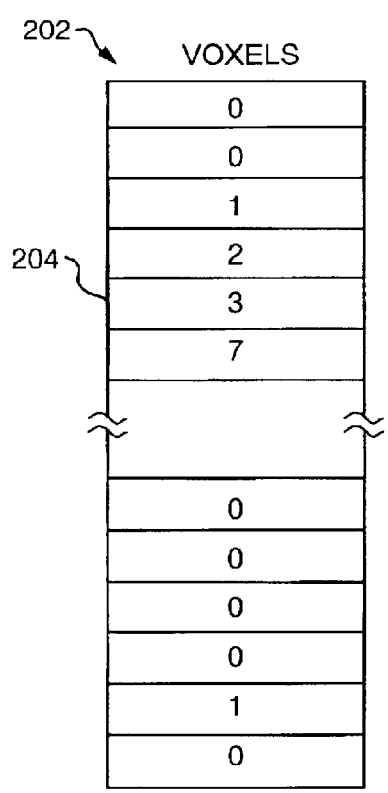
FIG. 2 is a representation of the storage of voxel values in a memory.
Figure 4:
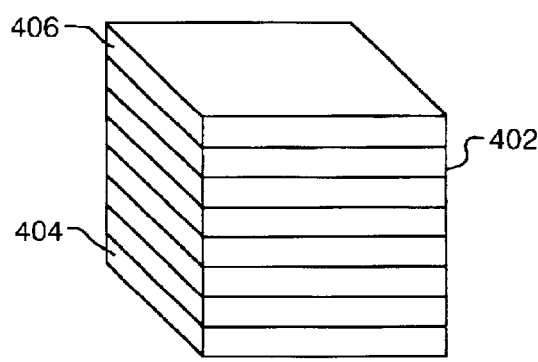
Figure 5:
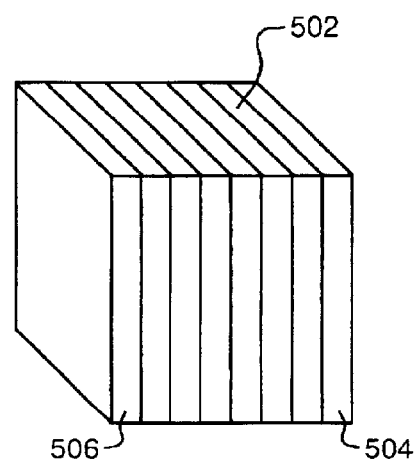
Figure 6:
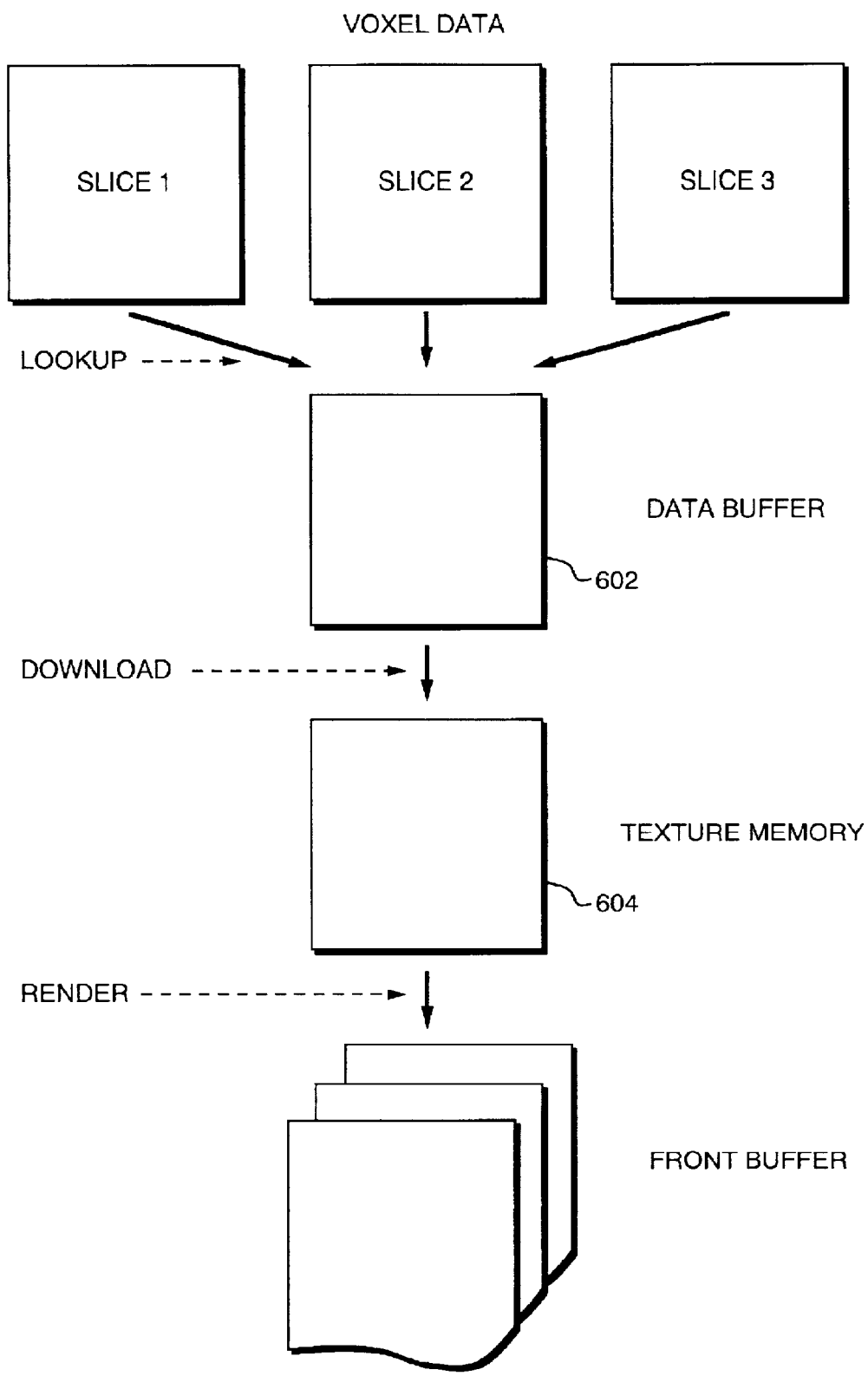
FIG. 6 is a representation of a volume rendered image without shading.
Figure 7:
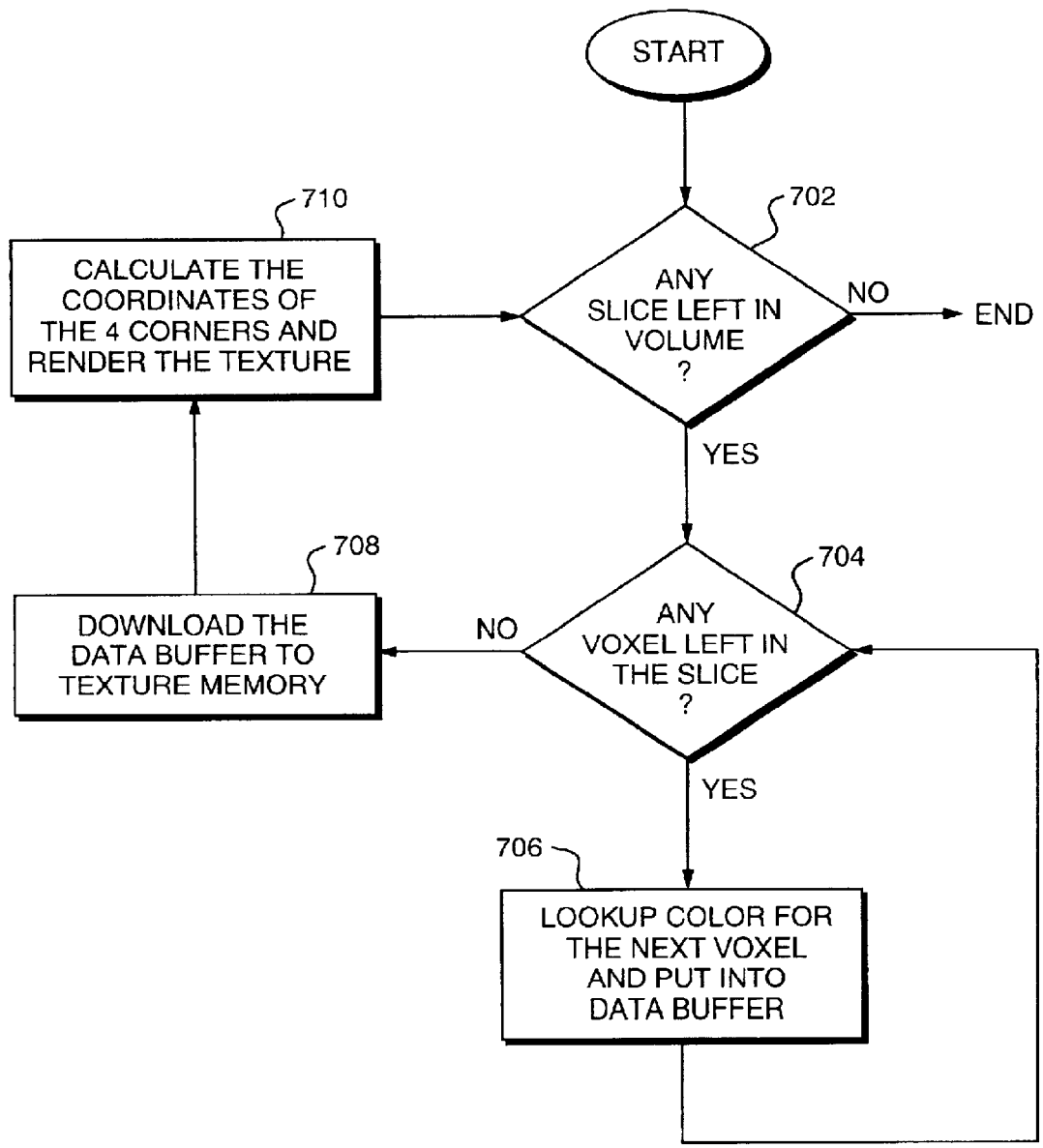
FIG. 7 is a block diagram of the steps in a volume rendering process.
Figure 8:
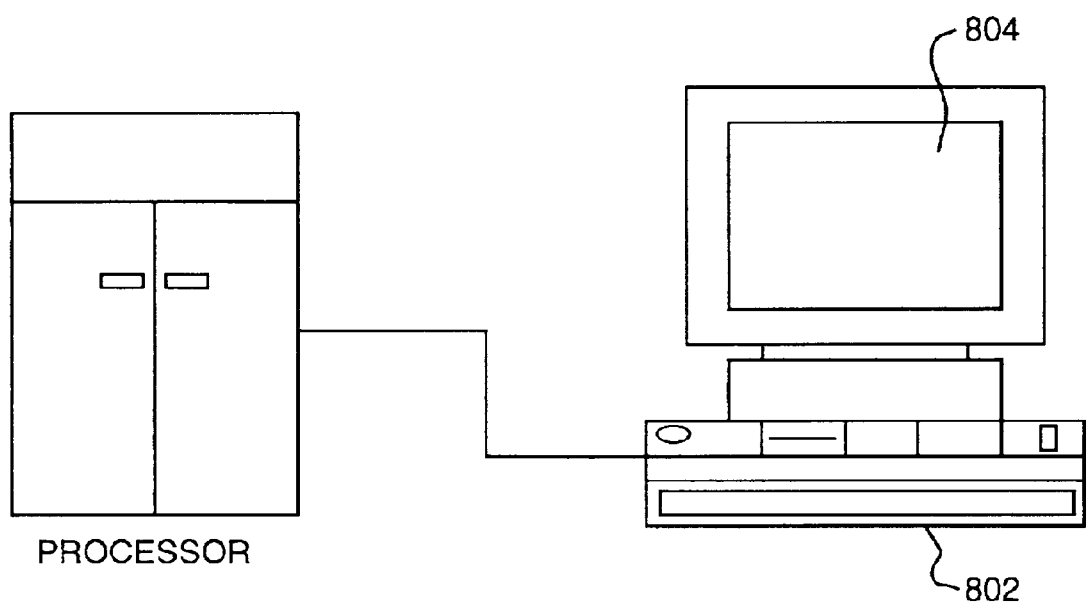
FIG. 8 is a block diagram of volume rendering equipment.
Figure 9:
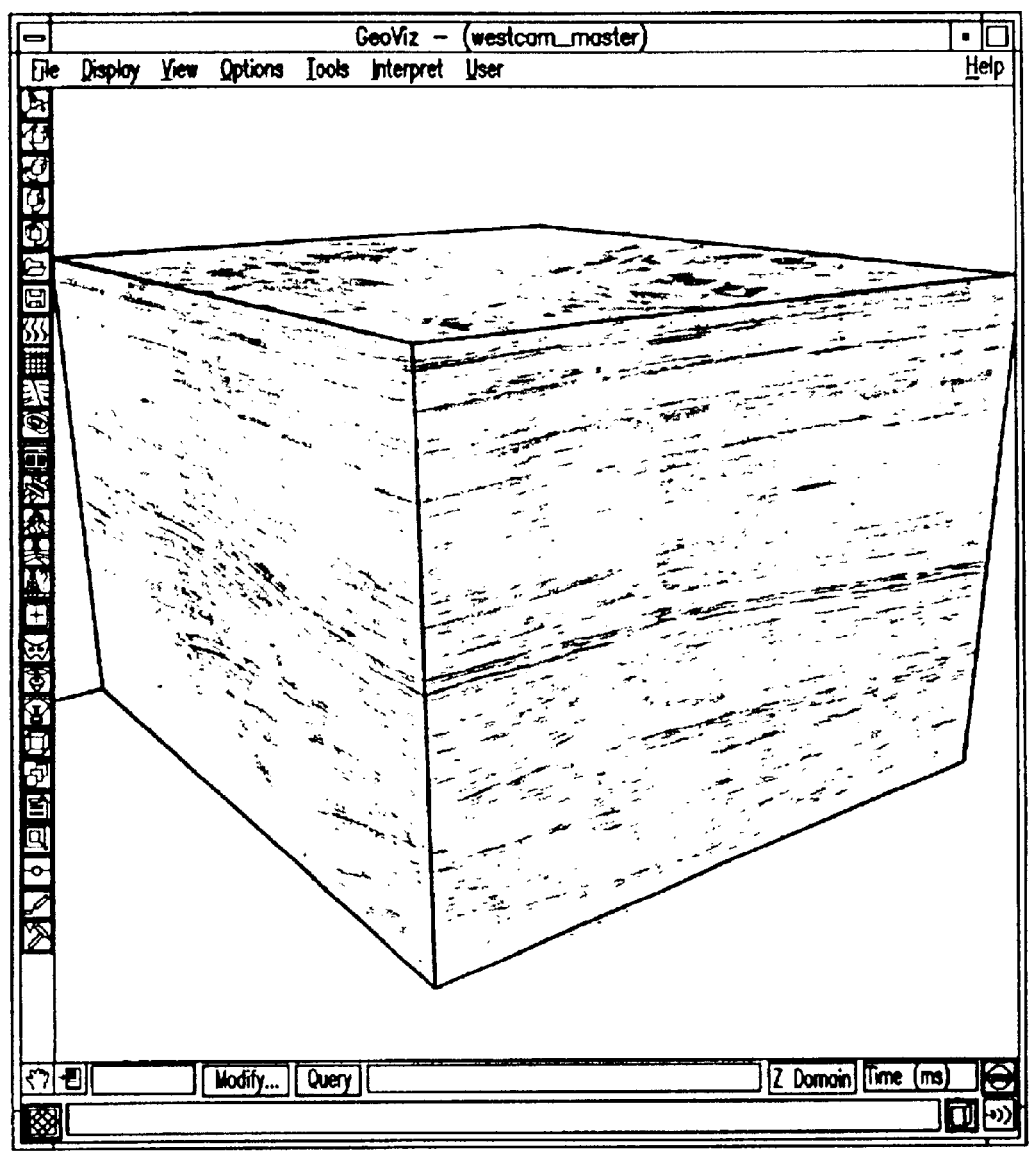
FIG. 9 is a rendering of an opaque volume.
Figure 16:
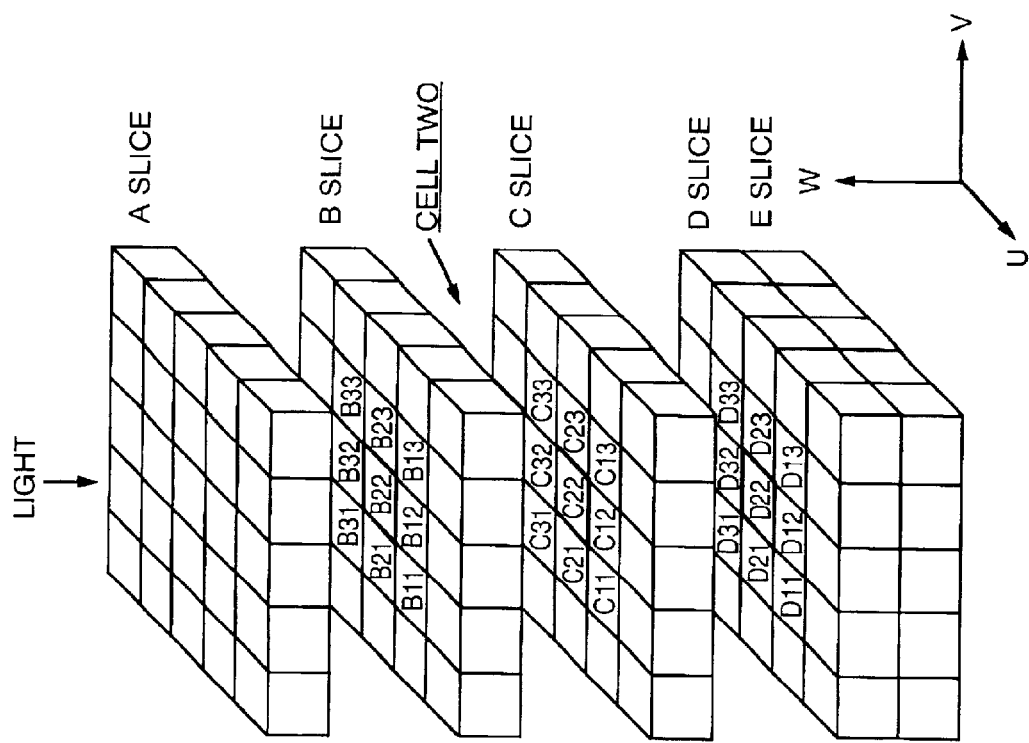
Figure 15:
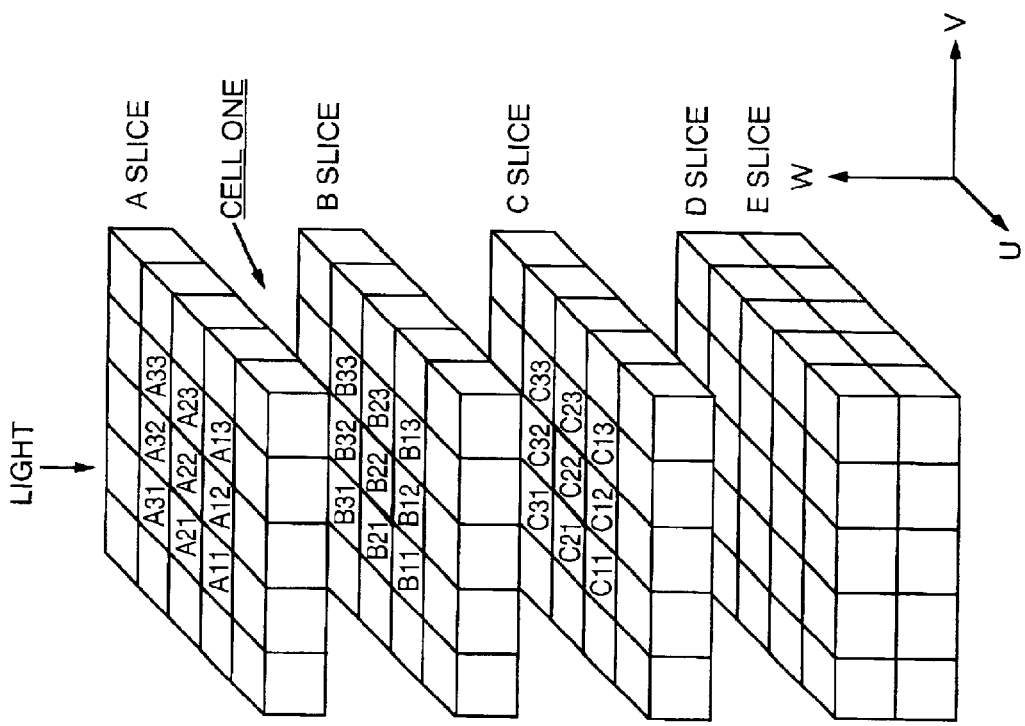

Volumetric data volume is first partitioned into slices as illustrated in FIGS. 3, 4 and 5, and the slices each contain rows and columns of voxels, not seen in these Figures but seen in FIGS. 15–17. Volume rendering of the data may be speeded by reducing the number of voxels that are processed, downloaded and rendered by eliminating transparent voxels. Such volume rendering is taught in the previously mentioned U.S. Pat. No. 6,304,266 that is incorporated herein by reference.

In FIGS. 15–17 are shown a representative volume of voxels formed into a plurality of slices A–E and cells, as particularly applied to geoscience data, voxels are grouped into cells containing no fewer than twenty-seven alpha-numeric designated voxels (eg. A11, C21) and forming a cube. Other undesignated voxels shown in these Figures are other voxels of the data volume in which the cells being described are located. Only one cell is shown in each of these Figures for simplicity, but in reality there would be many slices and many cells in each slice of a volume. These cells are described in greater detail hereinafter. The slices are shown separated from each other only for ease in seeing the twenty-seven voxels A11–A33, B11–B33 and C11–C33 that make up cells one and three in FIGS. 16 and 17 respectively, and the twenty-seven voxels B11–B33, C11–C33 and D11–D33 that make up cell two in FIG. 16.

For the purposes of this example, only horizontal slices are specifically shown in FIGS. 15, 16 and 17 but there are also vertical slices, and the intersecting orthogonal slices through the data volume are used to create the three dimensional rows and columns of voxels, as shown, so that, in this particular case, the vector/arrow direction of the light source is parallel to one of the three orthogonal axes (u,v,w) of the sliced data volume while the other two axes are orthogonal to the direction of the light source vector. In FIGS. 15 and 16 the light vector is parallel to axes W, and in FIG. 17 the light vector is parallel to axes V. Note that while the illustrations show the light direction parallel to one of the axes, the method employed supports arbitrary directions for the light source. The value of initial opacity, $\alpha$, for the voxels in each cell are used to calculate the values of visible opacity $\beta$ only for the voxels in each cell as described hereinafter with reference to FIGS. 18–20.

While the preferred cell size, as shown in FIGS. 15–17, is twenty-seven voxels forming a cube of 3×3×3 voxels, a different cell partitioning size might be appropriate for other data, such as medical or meteorological data. An example of another cell size may be one-hundred, twenty-five voxels forming a cube of 5×5×5 voxels. The number of voxels in a cell is based on the distribution of data in the volume.

In FIG. 15 cell one the particular voxel of interest is the center voxel B22. In FIG. 15 light is incident on the top of the data volume and cell one and is represented by the light source vector/arrow. In FIG. 16 cell two the particular voxel of interest is the center voxel C22. In FIG. 16 light is incident on the top of the data volume and cell two and is represented by the light source vector/arrow. In FIG. 17 cell three is made up of the same voxels as cell one, but light is incident on the right side of the data volume and cell three as represented by the light source vector/arrow.

Figure 10:
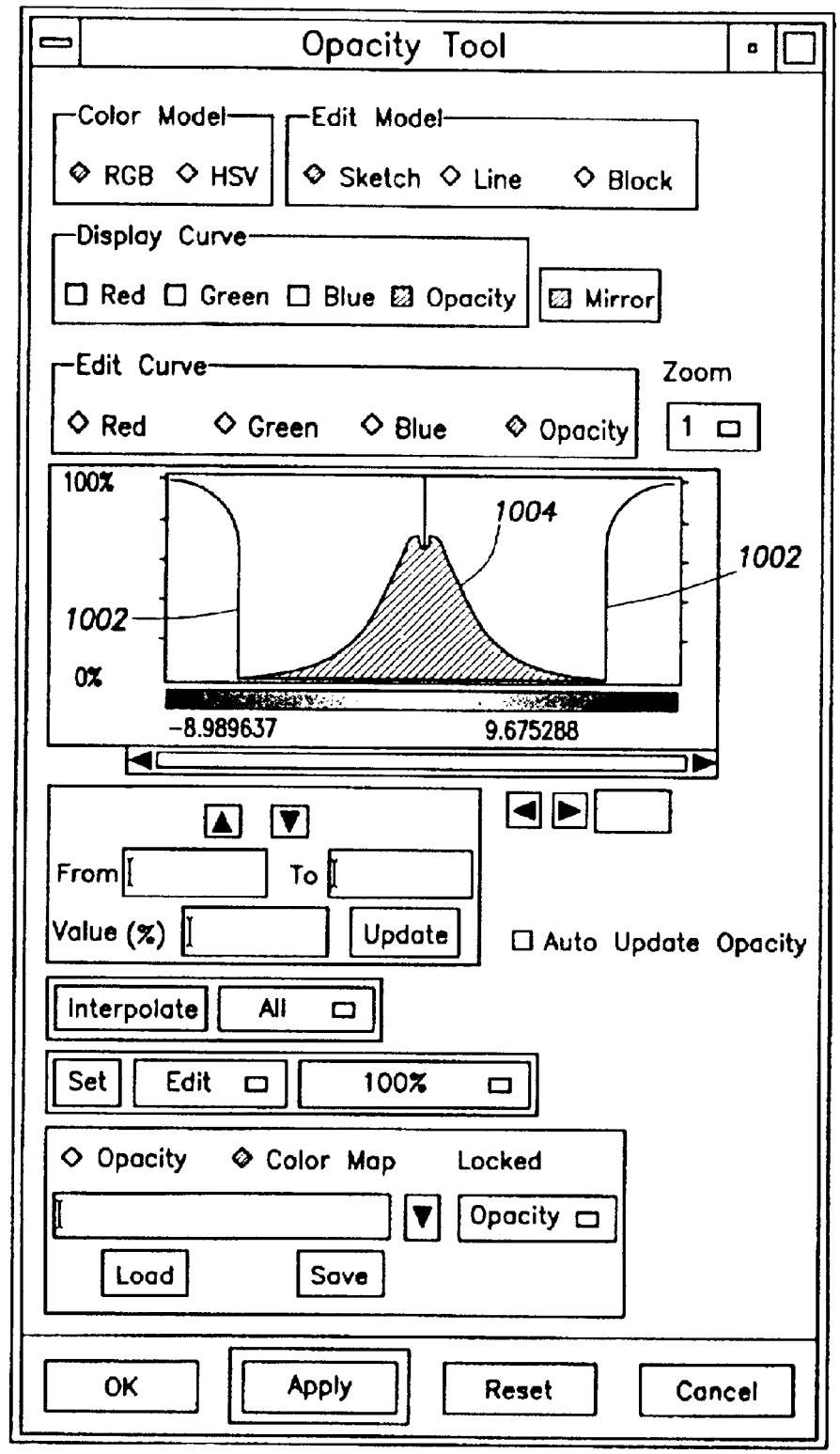
FIG. 10 is a representation of an opacity tool.
Figure 11:
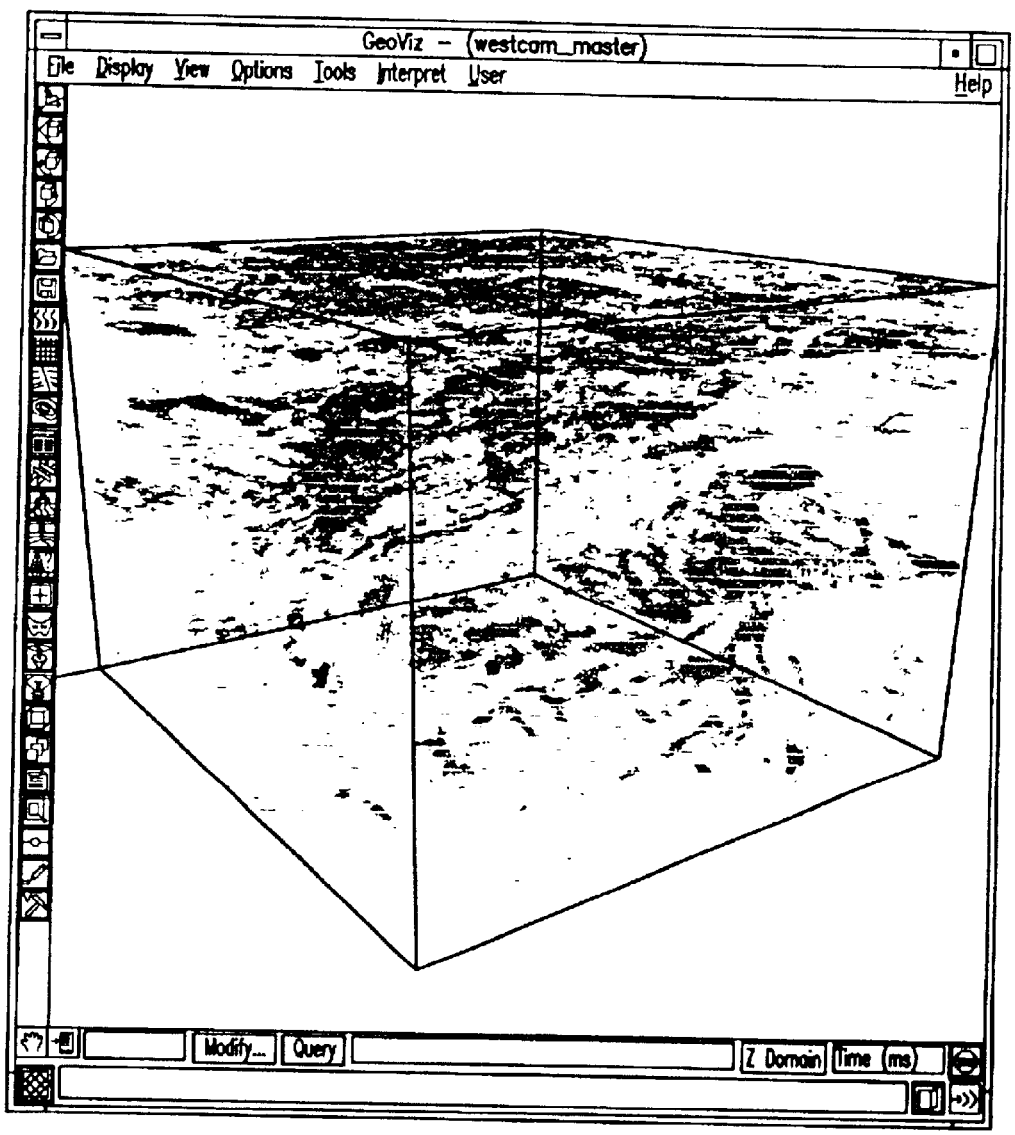
FIG. 11 is a rendering of a semi-transparent volume after an opaque volume is processed using an opacity tool.
Figure 12:
FIG. 12 shows the display of an elliptical object rendered using standard opacity volume rendering of volumetric data consisting of voxels without shading.
Figure 13:
FIG. 13 shows how an elliptical set of voxels would appear when displayed as a set of solid "bricks" lit with a light.

As briefly described above, the initial opacity value for each voxel in a data volume is first mapped with an opacity tool, such as the one illustrated in FIG. 10 and that is included in the GEOVIZ product of Schlumberger-GeoQuest, to obtain a "standard opacity" value a for each voxel in a data volume. The opacity tool adjusts the opacity mapping of voxels in the data volume to make transparent chosen voxels ($\alpha$=0) except, for example, those having large positive or negative values. This has the effect of making most of the data transparent when rendered, and structures inside the data volume are no longer obscured as can be seen in FIG. 11. This is a technique called "standard opacity volume rendering" and allows a user to make voxels within a selected range of data values invisible, while leaving others visible. The operator does this by changing the setting of the opacity tool. This technique is described in greater detail in U.S. Pat. No. 6,304,266 cited above.

In a simplified treatment of visibility we, first, find the largest component of the light incident on a data volume and mark it as the "visibility direction" (e.g., u, assuming that $L_u=\max(L_u,L_v,L_w)$). This would be the vector/ arrow in FIGS. 15–17. Thus, for a light coming from the u direction (not represented in FIGS. 15-17), the new "visible opacity" β value is computed using the following equations:

$$\text{if} \sum_{j,k} \alpha(i+1, j, k) > \sum_{j,k} \alpha(i-1, j, k)$$

$$\beta(i-1, j, k) = \alpha(i-1, j, k)$$

$$\beta(i, j, k) = \max(\beta(i-1, j, k), \alpha(i, j, k))$$

$$\beta(i+1, j, k) = \max(\beta(i, j, k), \alpha(i+1, j, k))$$

else $$\beta(i+1, j, k) = \alpha(i+1, j, k)$$

$$\beta(i, j, k) = \max(\beta(i+1, j, k), \alpha(i, j, k))$$

$$\beta(i-1, j, k) = \max(\beta(i, j, k), \alpha(i-1, j, k))$$

The above mathematical equations are used to calculate the visible opacity β for each voxel in each of the nine columns of three voxels in a cell, as viewed from the direction of the light, such as voxel column A11, B11, C11 and voxel column A23, B23, C23 in cell one. When a voxel column is viewed from the direction of the light source, if the first voxel is opaque all other voxels behind it cannot be seen. For example, in cell one in FIG. 15, if voxel A11 is opaque, voxels B11 and C11 behind it cannot be seen. Similarly, if voxel A11 is semi-transparent (initial opacity value between 0.0 and 1.0) the opacity value of voxels B11 and C11 behind voxel A11 cannot be any less. For example, if voxel A11 is semi-transparent with an opacity value of 0.7, voxels B11 and C11 cannot have a visible opacity value any lower than 0.7 and are changed accordingly in calculating visible opacity values P for voxels B11 and C11.

FIGS. 18–20 are tables used to simplify and more clearly show the mathematical calculations performed by the above equations to derive the new visible opacity values β, respectively, for all twenty-seven voxels in each of cells one, two and three using the "standard opacity" value α of the voxels in accordance with the teaching of the present invention. In the following description, "α" indicates standard opacity and when used as αA11 indicates the standard opacity of voxel A11, and "β" indicates the new visible opacity and when used as βA11 indicates the visible opacity of voxel A11.

Return to FIG. 15 to describe calculating visible opacity β values for all voxels in cell one as shown in the table in FIG. 18. With light being incident on the top of the volume in FIG. 15, and the A11–A33 voxels being on the top of the cell, the standard opacity value of each of the voxels A11–A33 (αA11–αA33) is equal to the visible opacity β value of each of these voxels. There is nothing in front of these voxels to block or alter the intensity of the light shining upon them, so their standard opacity will equal their visible opacity. This is represented in the "A slice" column in FIG. 18 as αA11=βA11, αA12=βA12 etc. through αA33=βA33.

To calculate the visible opacity β of voxel B11 behind voxel A11, and with standard opacity of voxel A11 (αA11) equal to the visible opacity βA11 of voxel A11, when βA11 is greater than the standard opacity of voxel B11 (αB11) behind it, then the value of visible opacity of voxel B11 (βB11) cannot be any smaller and is changed to equal the visible opacity of voxel A11. That is, the visible opacity of voxel B11, βB11, is set equal to the visible opacity value of voxel A11, βA11 (βB11=βA11). Conversely, if the visible opacity βA11 is less than or equal to the standard opacity αB11, then the visible opacity of voxel B11, βB11, is set equal to its standard opacity value (βB11=αB11). Continu-ing down the same column of voxels A11, B11 and C11 to the C11 voxel, and again using the same rationale, if the visible opacity of voxel B11, βB11, is greater than the standard opacity of voxel C11 αC11, then the visible opacity of voxel C11, βC11, is set equal to the visible opacity of voxel B11, βB11 (βC11=βB11). Conversely, if the visible opacity of voxel B11, βB11, is less than or equal to the standard opacity of voxel C11, αC11, then the visible opacity βC11 remains equal to its standard opacity (βC11=αC11).

This same determination of visible opacity for all voxels in cell one is repeated for each of the other of the nine columns of three voxels in FIG. 15 (e.g. voxel columns A32, B32 & C32; A22, B22 & C22; etc.). The visible opacity β values calculated in this manner for all voxels in cell one are used for the sole purpose of calculating the visual opacity gradient for only voxel B22 in the center of cell one as is described hereinafter with reference to FIG. 21. Although other cells, such as cell two, include many of the same voxels included in cell one, the values of visual opacity will be recalculated for all voxels in each cell, and the visual opacity values for voxels in cell two most likely may be different than those values calculated when the voxels are in cell one.

Although only one cell is shown in FIG. 15 there are in reality many cells in a data volume and the visible opacity β is determined for all voxels in the data volume. This is done by having each voxel at the center of a cell and performing the calculations described above. The voxels on the outer surface of the volume can be disregarded.

In FIG. 19 is a table showing how standard opacity α values of each of the voxels in cell two (FIG. 16) are used to obtain the new visible opacity β values for each of the voxels in cell two. With light being incident on the top of the data volume in FIG. 16, and the B11–B33 voxels of cell two being on the side of the cell from which the light is coming, the standard opacity value of each of the voxels B11–B33 is equal to the visible opacity value of each of these same voxels. This is represented in the "B slice" column in FIG. 19 as αB11=βB11, αB12=βB12 etc. through αB33=βB33.

When calculating the visible opacity of voxel C11 behind voxel B11, and using the rationale described in previous paragraphs, if the visible opacity βB11 is greater than the standard opacity a of voxel C11, then the visible opacity of voxel C11 is changed to equal the visible opacity of voxel B11. That is βC11=βB11. Conversely, if the visible opacity of voxel B11, βB11, is less than or equal to the standard opacity of voxel C11, αC11, then the visible opacity βC11 of voxel C11 is set equal to its standard opacity. That is βC11=αC11. Continuing down the column of voxels B11, C11 and D11, if the visible opacity of voxel C11, βC11, is greater than the standard opacity of voxel D11 αD11, then the visible opacity of voxel D11, βD11, is set equal to the visible opacity of voxel C11, βC11. That is βD11=βC11. Conversely, if the visible opacity of voxel C11, βC11, is less than or equal to the standard opacity of voxel D11, αD11, then the visible opacity βD11 remains equal to its standard opacity αD11. That is βD11=αD11.

This same calculation of visible opacity β for all voxels in cell two is repeated for each of the other nine columns of three voxels in cell two in FIG. 19 (e.g. voxel columns B32, C32 & D32; B22, C22 & D22; etc.). In this manner the visible opacity β of all voxels in cell two is calculated. The calculated value of visible opacity β for all voxels in cell two are only used in the equations in FIG. 22 to calculate the visible opacity gradient β of voxel C22 in the center of cell two.

Although only one cell is shown in FIG. 16 there are in reality many cells in a data volume and the visible opacity β is determined for all voxels in the data volume. This is done by having each voxel at the center of a cell and performing the calculations described above. The voxels on the outer surface of the volume can be disregarded.

In FIG. 17 is cell three that has the same voxels as cell one shown as in FIG. 15 but the direction of light on the data volume and cell three is from the right side, rather than from the top. Accordingly, calculations for visible opacity β are identical in manner but are different. The columns of three voxels are on their side through cell three. For example, voxels B23, B22, B21 and voxels C13, C12, C11. The tables for calculating visible opacity β for all voxels in cell two are shown in FIG. 20. In view of the previous description of how these calculations are made with reference to the tables in FIGS. 18 and 19, the description is not repeated here for the sake of brevity. The visible opacity β of all the voxels in cell three are used to calculate the visible opacity gradient $\overline{G}$ only for voxel B22 in the center of cell three as described hereinafter with reference to FIG. 23. Again, there are many cells in the data volume in FIG. 17 and visible opacity is determined for all voxels.

FIGS. 21–23 are tables used to describe the mathematical calculations performed to derive the three gradient components $G_u$, $G_v$, and $G_w$ that define a new visible opacity gradient $\overline{G}$ for only the voxel in the center of each of representative cells one, two and three in accordance with the teaching of the present invention. The gradients must be derived for all voxels in a data volume so similar tables are derived for the other voxels in a data volume, not just cells one, two and three. The three gradient components are calculated for every voxel using the newly calculated value of visible opacity β for all voxels in each cell. For cell one in FIG. 15 the center voxel is B22; for cell two in FIG. 16 the center voxel is C22; and for cell three in FIG. 17 the center voxel is B22. The new visible opacity gradient $\overline{G}$ for all voxels are then used to render the voxel data volume in a manner well known in the art. These calculations are repeated for each voxel in a volume and are described in greater detail hereinafter.

Return to cell one to describe how the visible opacity β values for each of the twenty-seven voxels in cell one are used to calculate the new visible opacity gradient $\overline{G}$ for center voxel B22. Using the visible opacity β values calculated for each of the twenty-seven voxels A11 through C33 in cell one, these values are used in the equations shown in FIG. 18 to calculate vector components $G_u$, $G_v$, and $G_w$ of vector $\overline{G}$ only for voxel B22 in the center of cell one. The vector components are then combined to get vector $\overline{G}$, the negative visible opacity gradient for voxel B22.

In the same manner, the new visible opacity β values calculated for each of the twenty-seven voxels B11 through D33 in cell two are used in the equations in FIG. 19 to calculate gradient components $G_u$, $G_v$ and $G_w$ of the visible opacity gradient vector $\overline{G}$ only for voxel B22 in the middle of cell two. The gradient components are then combined to get the negative visible opacity gradient for voxel B22.

Also, the visible opacity β values for the twenty-seven voxels A11 through C33 in cell three are used in the equations in FIG. 20 to calculate vector components $G_u$, $G_v$ and $G_w$ of the visible opacity gradient vector $\overline{G}$ only for voxel C22. The gradient components are then combined to get the negative visible opacity gradient for voxel C22. The basic gradient equations are known in the prior part and are described in more detail in the following paragraphs, but values of visible opacity β are used in the equations rather than values of standard opacity as previously used to derive the simplified calculations shown in FIGS. 21–23.

A negative opacity gradient, $\overline{G}$, at a particular voxel is determined by three partial derivatives along the three major axes, $G_u$, $G_v$, and $G_w$ as:

$$\overline{G}=(-G_u,-G_v,-G_w)$$

where the standard gradient equations used are:

$$G_u = \sum_{j,k} \alpha(i+1, j, k) - \sum_{j,k} \alpha(i-1, j, k)$$

$$G_v = \sum_{i,k} \alpha(i, j+1, k) - \sum_{j,k} \alpha(i, j-1, k)$$

$$G_w = \sum_{i,j} \alpha(i, j, k+1) - \sum_{i,j} \alpha(i, j, k-1)$$

However, in accordance with the teaching of the invention, these three standard gradient equations for calculating vector components $G_u$, $G_v$ and $G_w$ are modified to calculate a new negative "visible opacity gradient" vector $\overline{G}$, shown in the following the equations, by using the new visible opacity β values, rather than standard opacity values a shown in the equations immediately above. Substituting a value of visible opacity β in the standard gradient equations, the gradient equations then become:

$$G_u = \sum_{j,k} \beta(i+1, j, k) - \sum_{j,k} \beta(i-1, j, k)$$

$$G_v = \sum_{i,k} \beta(i, j+1, k) - \sum_{j,k} \beta(i, j-1, k)$$

$$G_w = \sum_{i,j} \beta(i, j, k+1) - \sum_{i,j} \beta(i, j, k-1)$$

where β(i,j,k) are the visual opacity of a single voxel along each its three major axes i,j,k.

Only visible voxels, selected using the opacity tool, and then further processed to derive visible opacity p for each visible voxel, are used to compute vector components $G_u$, $G_v$ and $G_w$ of negative visible opacity gradient $\overline{G}$, preferably using the 26-neighborhood central difference method described above, at each visible voxel using the modified equations immediately above. The negative visible opacity gradient $\overline{G}$ is calculated using the equation:

$$\overline{G}=(-G_u,-G_v,-G_w)$$

where the vector components $G_u$, $G_v$ and $G_w$ are calculated using the tables in FIGS. 21–23. These tables reflect the calculations in the above gradient equations.

Gradient $\overline{G}$ computed using the twenty-six neighborhood difference method have significantly more distinct values and result in smoother images than a six-neighborhood difference, although the latter is faster to compute but has only twenty-seven distinct values that result in abrupt changes of shading. For the present description we use the twenty-six neighborhood difference gradient of the opacity. These equations work regardless of the number of lights illuminating an object or the color of the light.

Figure 14:
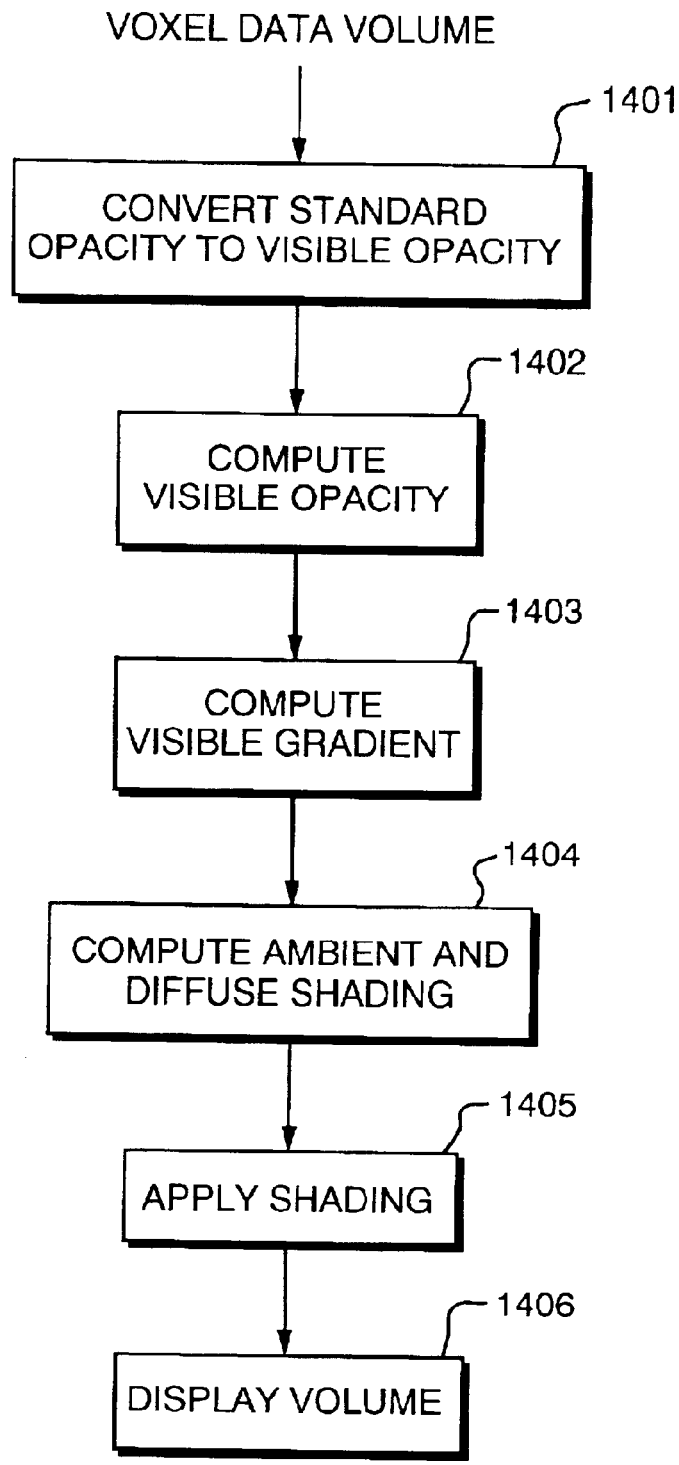
FIG. 14 shows in block diagram form the steps of processing and displaying volumetric geoscience data consisting of a volume of voxel data.

The new visible opacity gradient, $\overline{G}$, for each of voxels B22 (cell one), C22 (cell two) and B22 (cell three) are then used to calculate ambient and diffuse shading intensity for those voxels in a manner previously known, with the addition of special treatments provided by this invention, and generally described with reference to block 1404 in FIG. 14. Shading is computed as if it were applied to an opacity isosurface passing through all voxels in a volume in an ambient and diffuse illumination model wherein the voxel volume is illuminated with one or more light sources (typically directional and bi-directional). The direction of the negative visible opacity gradient vector serves in this case as a normal to the isosurface. Special treatment is added for the voxels inside opaque areas of the volume based on specifics of volumetric geoscience data, which improves a user's perception of the rendered image. A lighted and shaded volume offers the viewer ample visual information to aid in the perception of depth, as well as the shapes, orientations, and positions of objects in the volume.

As part of computing shading a decision is made if the volume being rendered is to be shaded as if lit by a uni-directional light source pointing in one direction or by bi-directional light consisting of two identical directional lights pointing in opposite directions on a volume. When the volume being rendered is lit by a uni-directional source the ambient and diffuse shading intensity is calculated using opacity ($I_{shading}=I(\beta)$) as follows:

if $\overline{G} \cdot \overline{L} > 0$ $I_{shading} = I_{ambient} + I_{diffuse}(\overline{G} \cdot \overline{L})/Norm(\overline{G})$ else if $\overline{G} \cdot \overline{L} \leq 0$ $I_{shading} = I_{ambient}$ where $\overline{G}$ is the negative visible opacity gradient, calculated as previously described, and $\overline{L}$ is the unit light vector.

For bi-directional light consisting of two identical directional lights pointing in opposite directions on the volume, the ambient and diffuse shading intensity is calculated as follows:

if $\overline{G} \cdot \overline{L} > 0$ $I_{shading} = I_{ambient} + I_{diffuse}(\overline{G} \cdot \overline{L})/Norm(\overline{G})$ else if $\overline{G} \cdot \overline{L} \leq 0$ $I_{shading} = I_{ambient} - I_{diffuse}(\overline{G} \cdot \overline{L})/Norm(\overline{G})$ where $\overline{G}$ is the vector of the negative visible opacity gradient and $\overline{L}$ is the unit light vector.

For the case of $\overline{G}=0$ (when and only when $Norm(\overline{G})=0$) deserves special treatment. There exist four possible scenarios:

a) $\overline{G}=0$ and the opacity value in the voxel is 0.0 ($\beta(i,j,k)=0$). We treat this case as an empty space and set $I_{shading}=0$.

b) $\overline{G}=0$ while the data value in the voxel is not 0.0 ($\beta(i,j,k)\neq 0$), data values of the surrounding voxels are not all 0.0, and $$\sum_{j,k}\beta(i+1,j,k) = \sum_{i,k}\beta(i,j+1,k) = \sum_{i,j}\beta(i,j,k+1)$$

In this case the voxel is treated as positioned within a homogeneous voxel body. Theoretically, in this case an isosurface that would pass through the voxel is not defined and, thus, the voxel should not be shaded ($I_{shading}=1$). This produces visual artifacts when somebody observes the rendered image. In order to eliminate it, we choose to assign such voxels an artificial gradient $\overline{G}_{prefered}$ and set the shading intensity in such a voxel to be:

$I_{shading}=I_{ambient}+I_{diffuse}(\overline{G}_{prefered}\cdot\overline{L})$

For most of 3D geoscience volumes there are horizontal layers in the data so the most reasonable choice for $\overline{G}_{prefered}$ is:

$\overline{G}_{prefered}=(0,0,1)$ c) $\overline{G}=0$ while the data value in the voxel is not 0.0 ($\beta(i,j,k)\neq 0$), but data values of all the surrounding voxels are 0.0. In this case of a single voxel surrounded by empty space the direction of the visual opacity gradient in not defined. Thus, we arbitrary select it to satisfy the equations from scenario (b) immediately above.

d) The rest of the scenarios might require re-computing $\overline{G}$ by using right differences or some other known method. The required computations are time consuming. The shading computed using the formula in scenario (b) above for most voxels approximates the precisely computed ones reasonably well.

After the shading intensity has been computed, including the special treatment in scenarios (a)–(d), it is applied to a color-coded opacity volume. This was referred to with reference to block 1405 in FIG. 14. There are multiple ways known to implement this. Often, the color of a voxel is derived from the associated data value, $\mu$, using a color palette, also called a look-up table or LUT, as:

$(r,g,b,\alpha)=LUT(\mu)$ where LUT is essentially a one-dimensional array of $r,g,b,\alpha$ quadruples indexed by the data value, $\mu$. Thus, whenever a color palette is used, the color of a voxel is a function of only the data value.

When we apply shading to a voxel, the final color of the voxel depends not only on the data value, but also on the shading intensity associated with the voxel. The initial formula calls for multiplication of each of the color components of each voxel by the shading intensity for the voxel. This requires many additional computations, slowing the process. One could alternatively use an extended color palette, SHADING_LUT, which is a two dimensional matrix composed of $r,g,b,\alpha$ columns computed for different values of shading intensity, $I_{shading}$. Once pre-computed, such an extended color palette could be used to look-up a color of a shaded voxel using the data value, $\mu$, and shading intensity, $I_{shading}$, as indexes:

$(r,g,b,\alpha)=SHADING\_LUT(\mu, I_{shading})$

The initial coloring $(r,g,b)$ of a 3D seismic opacity volume does not depend on the volume opacity and can be specified based on any data values associated with a volume (e.g., amplitude, instantaneous frequency, etc.). In order to simulate illumination of a voxel by a white light, the color components of voxel material are modified by multiplying them with the shading intensity:

$(r_{shaded}, g_{shaded}, b_{shaded},\alpha)=(I_{shading}r, I_{shading}g, I_{shading}b,\alpha)$ The results obtained from this calculation are the rendered volumetric data that is used to display the 3D seismic information volume on a 2D display device.

While what has been described hereinabove is the preferred embodiment of the invention it will be appreciated by those skilled in the art that numerous changes may be made without departing from the spirit and scope of the invention.

What is claimed is:

1. A method for rendering a volume of voxel data with shading and opacity, wherein each voxel comprises a value representative of a parameter at a location within the volume and each voxel has an initial value of opacity, the method comprising the steps of:

calculating a revised value of opacity for each of the voxels in the volume, by the revised value of opacity of a voxel being dependent upon its initial value of opacity and the revised value of opacity of voxels proximate thereto; and calculating an opacity gradient for each of the voxels in the volume using the calculated revised values of opacity for all voxels, wherein the step of calculating a revised value of opacity further comprises the steps of:

creating a cell of voxels surrounding each voxel in the volume, wherein all voxels in each cell are arranged into groups so that each voxel in each group of voxels within each cell are positioned one behind the other in a line parallel to the primary direction of light;

setting the revised value of opacity of the voxel closest to the source of light in each group of voxels in each cell equal to its initial value of opacity; and setting the revised value of opacity of all other voxels in each group of voxels in each cell equal to the revised value of opacity of an adjacent voxel in the same group of voxels that is closer to the source of light if the revised value of opacity of the closer voxel is equal to or greater than the initial value of opacity of the adjacent other voxel, and setting the revised value of opacity of the adjacent other voxel equal to its initial value of opacity if the revised value of opacity of the closer voxel is less than the initial value of opacity of the adjacent other voxel.

2. The volume rendering method of claim 1 wherein the step of calculating an opacity gradient for each of the voxels in the volume using the calculated revised values of opacity for all voxels further comprises the steps of:

combining the revised values of opacity for the voxels in each cell to derive three orthogonal opacity gradient components for the voxel in the center of each cell; and combining the three orthogonal opacity gradient components for the voxel in the center of each cell to derive an opacity gradient that is normal to an isosurface passing through the voxel in the center of each cell.

3. A method for rendering a volume of voxel data with shading and opacity, wherein each voxel comprises a value representative of a parameter at a location within the volume and each voxel has an initial value of opacity, the method comprising the steps of:

calculating a revised value of opacity for each of the voxels in the volume, by the revised value of opacity of a voxel being dependent upon its initial value of opacity and the revised value of opacity of voxels proximate thereto; and calculating an opacity gradient for each of the voxels in the volume using the calculated revised values of opacity for all voxels, wherein the step of calculating an opacity gradient for each of the voxels in the volume using the calculated revised values of opacity for all voxels further comprises the steps of:

combining the revised values of opacity for the voxels in each cell to derive three orthogonal opacity gradient components for the voxel in the center of each cell; and combining the three orthogonal opacity gradient components for the voxel in the center of each cell to derive an opacity gradient that is normal to an isosurface passing through the voxel in the center of each cell.

4. The volume rendering method of claim 2 further comprising the steps of:

calculating shading for the volume using the opacity gradient; and displaying the rendered volume on the display device.

5. A method for rendering a volume of voxel data with shading and opacity dependent upon the direction of a source of light specified to be illuminating the volume for rendering, wherein each voxel comprises a value representative of a parameter at a location within the volume and each voxel has an initial value of opacity, the method comprising the steps of:

(1) calculating a revised value of opacity for a first voxel in the volume by creating a cell of voxels surrounding the first voxel, wherein all voxels in the cell are arranged into groups so that each voxel in each group of voxels within the cell are positioned one behind the other in a line parallel to the primary direction of light, the revised opacity calculation step further comprising the steps of:

(a) setting the revised value of opacity of the voxel closest to the source of light in each group of voxels in the cell equal to its initial value of opacity; and (b) setting the revised value of opacity of other voxels in the groups of voxels in the cell equal to the revised value of opacity of an adjacent voxel in the same group of voxels that is closer to the source of light if the revised value of opacity of the closer voxel is equal to or greater than the initial value of opacity of the other voxel, and setting the revised value of opacity of the other voxel equal to the initial value of opacity of the other voxel if the revised value of opacity of the closer voxel is less than the initial value of opacity of the other voxel;

(2) repeating the revised opacity calculations step for all other voxels in the volume other than the first voxel; and (3) calculating a gradient of opacity for each of the voxels in the volume using the calculated revised values of opacity for all voxels.

6. The volume rendering method of claim 5 wherein the step of calculating an opacity gradient for each of the voxels in the volume using the calculated revised values of opacity for all voxels further comprises the steps of:

combining the revised values of opacity for the voxels in each cell to derive three orthogonal opacity gradient components for the voxel in the center of the last mentioned cell; and combining the three orthogonal opacity gradient components for the voxel in the center of each cell to derive an opacity gradient that is normal to an isosurface passing through the voxel in the center of the last mentioned cell.

7. The volume rendering method of claim 5 further comprising the steps of:

calculating shading for the volume using the opacity gradient; and displaying the rendered volume on the display device.

8. The volume rendering method of claim 6 further comprising the steps of:
- calculating shading for the volume using the opacity gradient; and
- displaying the rendered volume on the display device.

9. A method for rendering a volume of voxel data with shading and opacity dependent upon the direction of a source of light specified to be illuminating the volume for rendering, wherein each voxel comprises a value representative of a parameter at a location within the volume and each voxel has an initial value of opacity, the method comprising the steps of:
- (1) calculating a revised value of opacity for a first voxel in the volume by creating a cell of voxels surrounding the first voxel, wherein all voxels in the cell are arranged into groups so that each voxel in each group of voxels within the cell are positioned one behind the other in a line parallel to the primary direction of light, the revised opacity calculation step further comprising the steps of:
  - (a) setting the revised value of opacity of the voxel closest to the source of light in each group of voxels in the cell equal to its initial value of opacity;
  - (b) setting the revised value of opacity of other voxels in the groups of voxels in the cell equal to the revised value of opacity of an adjacent voxel in the same group of voxels that is closer to the source of light if the revised value of opacity of the closer voxel is equal to or greater than the initial value of opacity of the other voxel, and setting the revised value of opacity of the other voxel equal to the initial value of opacity of the other voxel if the revised value of opacity of the closer voxel is less than the initial value of opacity of the other voxel;
- (2) repeating the revised opacity calculations step for all other voxels in the volume other than the first voxel;
- (3) calculating three orthogonal opacity gradient components for the first voxel, one of the orthogonal opacity gradient components being parallel to the primary direction of light, the opacity gradient calculation step further comprising the steps of:
  - (a) combining the revised values of opacity for the voxels in the cell to derive the three orthogonal opacity gradient components for the first voxel; and
  - (b) combining the three orthogonal opacity gradient components for the first voxel to derive an opacity gradient that is normal to an isosurface passing through the first voxel;
  - (c) repeating the opacity gradient calculation step for all other voxels in the volume other than the first voxel.

10. The volume rendering method of claim 9 further comprising the steps of:
- calculating shading for the volume using the opacity gradient; and
- displaying the rendered volume on the display device.

11. An apparatus for rendering a volume of voxel data with shading and opacity, wherein each voxel comprises a value representative of a parameter at a location within the volume and each voxel has an initial value of opacity, the rendering apparatus comprising:
- means for calculating a revised value of opacity for each of the voxels in the volume, the revised value of opacity of a voxel being dependent upon its initial value of opacity and the revised value of opacity of voxels proximate thereto; and
- means for calculating an opacity gradient for each of the voxels in the volume using the calculated revised values of opacity for all voxels wherein the means for calculating a revised value of opacity further comprises:
  - means for creating a cell of voxels surrounding each voxel in the volume, wherein all voxels in each cell are arranged into groups so that each voxel in each group of voxels within each cell are positioned one behind the other in a line parallel to the primary direction of light;
  - means for setting the revised value of opacity of the voxel closest to the source of light in each group of voxels in each cell equal to its initial value of opacity; and
  - means for setting the revised value of opacity of all other voxels in each group of voxels in each cell equal to the revised value of opacity of an adjacent voxel in the same group of voxels that is closer to the source of light if the revised value of opacity of the closer voxel is equal to or greater than the initial value of opacity of the adjacent other voxel, and setting the revised value of opacity of the adjacent other voxel equal to its initial value of opacity if the revised value of opacity of the closer voxel is less than the initial value of opacity of the adjacent other voxel.

12. The volume rendering apparatus of claim 11 wherein the means for calculating an opacity gradient for each of the voxels in the volume using the calculated revised values of opacity for all voxels further comprises:
- means for combining the revised values of opacity for the voxels in each cell to derive three orthogonal opacity gradient components for the voxel in the center of each cell; and
- means for combining the three orthogonal opacity gradient components for the voxel in the center of each cell to derive an opacity gradient that is normal to an isosurface passing through the voxel in the center of each cell.

13. An apparatus for rendering a volume of voxel data with shading and opacity, wherein each voxel comprises a value representative of a parameter at a location within the volume and each voxel has an initial value of opacity, the rendering apparatus comprising:
- means for calculating a revised value of opacity for each of the voxels in the volume, the revised value of opacity of a voxel being dependent upon its initial value of opacity and the revised value of opacity of voxels proximate thereto; and
- means for calculating an opacity gradient for each of the voxels in the volume using the calculated revised values of opacity for all voxels, wherein the means for calculating an opacity gradient for each of the voxels in the volume using the calculated revised values of opacity for all voxels further comprises:
- means for combining the revised values of opacity for the voxels in each cell to derive three orthogonal opacity gradient components for the voxel in the center of each cell; and
- means for combining the three orthogonal opacity gradient components for the voxel in the center of each cell to derive an opacity gradient that is normal to an isosurface passing through the voxel in the center of each cell.

14. The volume rendering apparatus of claim 12 further comprising:

means for calculating shading for the volume using the opacity gradient; and means for displaying the rendered volume on a display device.

15. Apparatus for rendering a volume of voxel data with shading and opacity dependent upon the direction of a source of light specified to be illuminating the volume for rendering, wherein each voxel comprises a value representative of a parameter at a location within the volume and each voxel has an initial value of opacity, the apparatus comprising:

(1) means for calculating a revised value of opacity for a first voxel in the volume by creating a cell of voxels surrounding the first voxel, wherein all voxels in the cell are arranged into groups so that each voxel in each group of voxels within the cell are positioned one behind the other in a line parallel to the primary direction of light, the revised opacity calculation means further comprising:

(a) means for setting the revised value of opacity of the voxel closest to the source of light in each group of voxels in the cell equal to its initial value of opacity; and (b) means for setting the revised value of opacity of other voxels in the groups of voxels in the cell equal to the revised value of opacity of an adjacent voxel in the same group of voxels that is closer to the source of light if the revised value of opacity of the closer voxel is equal to or greater than the initial value of opacity of the other voxel, and setting the revised value of opacity of the other voxel equal to the initial value of opacity of the other voxel if the revised value of opacity of the closer voxel is less than the initial value of opacity of the other voxel;

(2) means for repeating the revised opacity calculations for all other voxels in the volume other than the first voxel; and (3) means for calculating a gradient of opacity for each of the voxels in the volume using the calculated revised values of opacity for all voxels.

16. The volume rendering apparatus of claim 15 wherein the means for calculating an opacity gradient for each of the voxels in the volume using the calculated revised values of opacity for all voxels further comprises:

means for combining the revised values of opacity for the voxels in each cell to derive three orthogonal opacity gradient components for the voxel in the center of the last mentioned cell; and means for combining the three orthogonal opacity gradient components for the voxel in the center of each cell to derive an opacity gradient that is normal to an isosurface passing through the voxel in the center of the last mentioned cell.

17. The volume rendering apparatus of claim 15 further comprising:

means for calculating shading for the volume using the opacity gradient; and means for displaying the rendered volume on the display device.

18. The volume rendering apparatus of claim 16 further comprising:

means for calculating shading for the volume using the opacity gradient; and means for displaying the rendered volume on the display device.

19. Apparatus for rendering a volume of voxel data with shading and opacity dependent upon the direction of a source of light specified to be illuminating the volume for rendering, wherein each voxel comprises a value representative of a parameter at a location within the volume and each voxel has an initial value of opacity, the apparatus comprising:

(1) means for calculating a revised value of opacity for a first voxel in the volume by creating a cell of voxels surrounding the first voxel, wherein all voxels in the cell are arranged into groups so that each voxel in each group of voxels within the cell are positioned one behind the other in a line parallel to the primary direction of light, the revised opacity calculation means further comprising:

(a) means for setting the revised value of opacity of the voxel closest to the source of light in each group of voxels in the cell equal to its initial value of opacity;

(b) means for setting the revised value of opacity of other voxels in the groups of voxels in the cell equal to the revised value of opacity of an adjacent voxel in the same group of voxels that is closer to the source of light if the revised value of opacity of the closer voxel is equal to or greater than the initial value of opacity of the other voxel, and setting the revised value of opacity of the other voxel equal to the initial value of opacity of the other voxel if the revised value of opacity of the closer voxel is less than the initial value of opacity of the other voxel;

(2) means for repeating the revised opacity calculations for all other voxels in the volume other than the first voxel;

(3) means for calculating three orthogonal opacity gradient components for the first voxel, and one of the orthogonal opacity gradient components is parallel to the primary direction of light, the opacity gradient calculation means further comprising:

(a) means for combining the revised values of opacity for the voxels in the cell to derive the three orthogonal opacity gradient components for the first voxel;

(b) means for combining the three orthogonal opacity gradient components for the first voxel to derive an opacity gradient that is normal to an isosurface passing through the first voxel; and (c) means for repeating the opacity gradient calculations for all other voxels in the volume other than the first voxel; and (4) means for calculating shading for the volume using the opacity gradient.

20. The volume rendering apparatus of claim 19 further comprising:

means for calculating shading for the volume using the opacity gradient; and means for displaying the rendered volume on the display device.

21. A computer readable medium containing executable instructions for rendering on a display device a volume of voxel data with shading and opacity dependent upon the direction of a source of light specified to be illuminating the volume for rendering, wherein each voxel comprises a value representative of a parameter at a location within the volume and each voxel has an initial value of opacity, the executable program instructions comprising program instructions for:

(1) calculating a revised value of opacity for a first voxel in the volume by creating a cell of voxels surrounding the first voxel, wherein all voxels in the cell are arranged into groups so that each voxel in each group of voxels within the cell are positioned one behind the other in a line parallel to the primary direction of light, the revised opacity calculation means further comprising:

(a) setting the revised value of opacity of the voxel closest to the source of light in each group of voxels in the cell equal to its initial value of opacity; and (b) setting the revised value of opacity of other voxels in the groups of voxels in the cell equal to the revised value of opacity of an adjacent voxel in the same group of voxels that is closer to the source of light if the revised value of opacity of the closer voxel is equal to or greater than the initial value of opacity of the other voxel, and setting the revised value of opacity of the other voxel equal to the initial value of opacity of the other voxel if the revised value of opacity of the closer voxel is less than the initial value of opacity of the other voxel;

(2) repeating the revised opacity calculations for all other voxels in the volume other than the first voxel;

(3) calculating a gradient of opacity for each of the voxels in the volume using the calculated revised values of opacity for all voxels; and (4) calculating shading for the volume using the opacity gradient.

* * * * *